United States Patent
Eldar

(10) Patent No.: US 9,870,605 B2
(45) Date of Patent: *Jan. 16, 2018

(54) ACCELERATED LENS DISTORTION CORRECTION WITH NEAR-CONTINUOUS WARPING OPTIMIZATION

(71) Applicant: Intel Corporation, Santa Clara, CA (US)

(72) Inventor: Avigdor Dori Eldar, Modiin (IL)

(73) Assignee: INTEL Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/366,221

(22) Filed: Dec. 1, 2016

(65) Prior Publication Data

US 2017/0084010 A1    Mar. 23, 2017

Related U.S. Application Data

(63) Continuation of application No. 14/794,952, filed on Jul. 9, 2015, now Pat. No. 9,536,287.

(51) Int. Cl.
| | |
|---|---|
| *G06T 5/00* | (2006.01) |
| *G06T 3/00* | (2006.01) |
| *G06K 9/48* | (2006.01) |
| *G06T 3/40* | (2006.01) |

(52) U.S. Cl.
CPC .......... *G06T 5/006* (2013.01); *G06K 9/481* (2013.01); *G06T 3/0093* (2013.01); *G06T 3/4007* (2013.01); *G06T 5/002* (2013.01); *G06T 2207/10021* (2013.01); *G06T 2207/10028* (2013.01)

(58) Field of Classification Search
CPC ....... G06T 5/002; G06T 5/006; G06T 3/4007; G06T 2207/10021; G06K 9/481

USPC .................................................. 382/275, 304
See application file for complete search history.

(56) References Cited

U.S. PATENT DOCUMENTS

2010/0283874 A1    11/2010  Kinrot
2013/0083309 A1    4/2013   Shim et al.
(Continued)

FOREIGN PATENT DOCUMENTS

KR         20120020821 A      3/2012

OTHER PUBLICATIONS

PCT Search Report & Written Opinion for PCT Application No. PCT/US2016/036166 dated Sep. 7, 2016, 12 pages.

*Primary Examiner* — Yubin Hung
(74) *Attorney, Agent, or Firm* — Finch & Maloney PLLC

(57) ABSTRACT

A digital image processing technique, such as an image warping operation, is stored in a pre-computed lookup table (LUT) prior to image processing. The LUT represents a pixel-to-pixel mapping of pixel coordinates in a source image to pixel coordinates in a destination image. For vectors containing only inlier pixels, a fast remap table is generated based on the original LUT. Each SIMD vector listed in the fast remap is indexed to the coordinates of one of the source pixels that maps to one of the destination pixels in the vector. Other SIMD vectors that contain at least one outlier pixel are listed in an outlier index. For each vector indexed in the fast remap, linear vector I/O operations are used to load the corresponding source pixels instead of using scatter/gather vector I/O load operations via the LUT. The remaining outlier pixels are processed using scatter/gather I/O operations via the LUT.

25 Claims, 8 Drawing Sheets

(56) References Cited

U.S. PATENT DOCUMENTS

2013/0321674 A1    12/2013   Cote et al.
2014/0198989 A1     7/2014   Weber

ACCELERATED LENS DISTORTION CORRECTION WITH NEAR-CONTINUOUS WARPING OPTIMIZATION

RELATED APPLICATION

This application is a continuation of U.S. application Ser. No. 14/794,952, filed Jul. 9, 2015, now U.S. Pat. No. 9,536,287, which is incorporated herein by reference in its entirety.

FIELD OF THE DISCLOSURE

The present disclosure generally relates to techniques for digital image processing in single-instruction-multiple-data (SIMD) processing environments, and more particularly, to techniques for image warping, including accelerated lens distortion correction and image rectification in stereo vision applications.

BACKGROUND

In the field of digital image processing and stereo vision, image warping is a transformation process based on pixel coordinate mapping (e.g., independently of color values). Image warping may, for example, be used to correct distortion of an image caused by a camera lens, and for image rectification, which is a transformation process used to project two or more images onto a common image plane.

DETAILED DESCRIPTION

Figure 1:
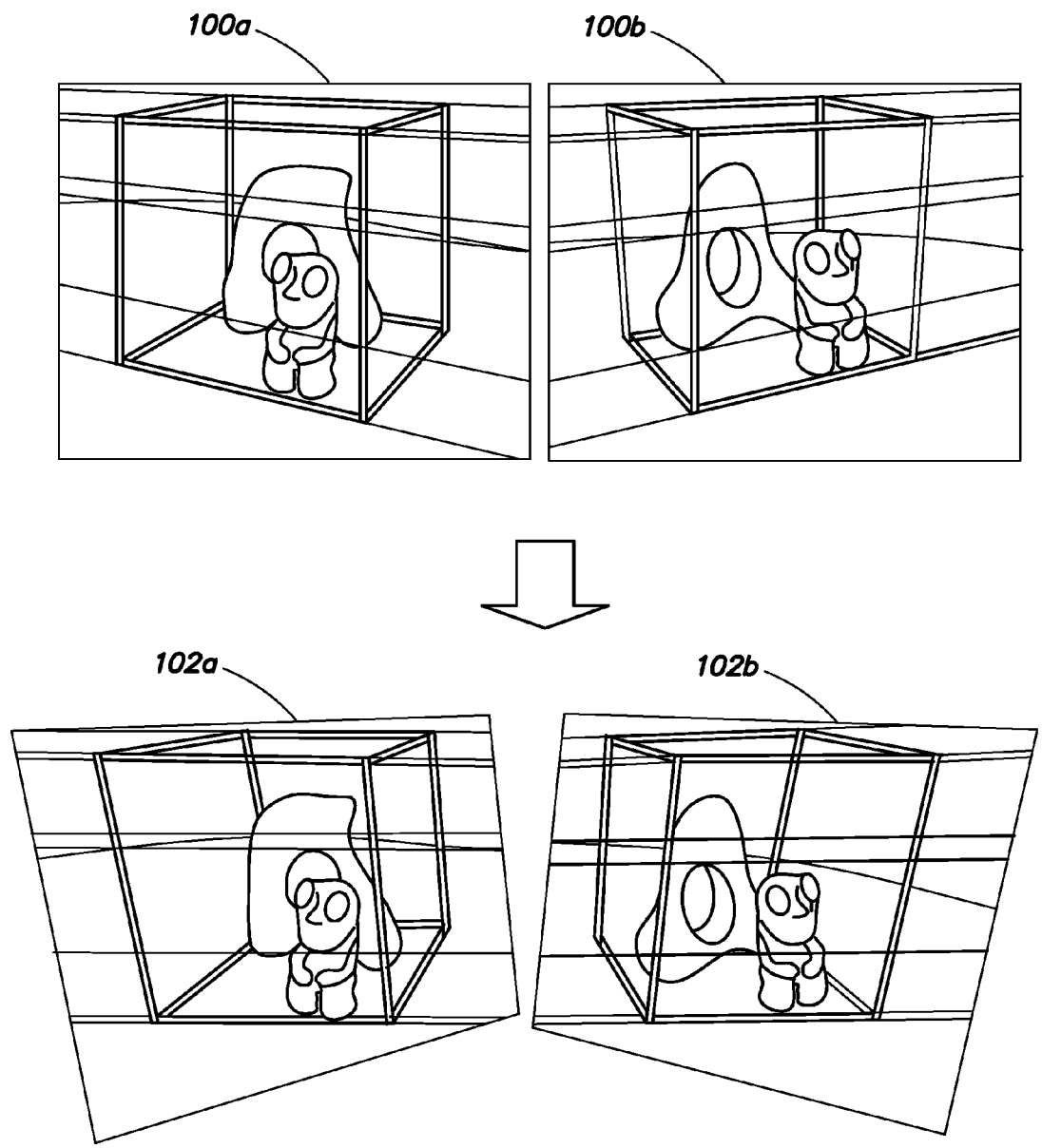
FIG. 1 shows several example images pertaining to the field of digital image processing and stereo vision, in accordance with an embodiment of the present disclosure.

Techniques are disclosed for efficient processing of digital images, including techniques for accelerated lens distortion correction and image rectification in digital stereo vision applications. In an embodiment, additional lookup tables (LUTs) are generated based on a pre-computed LUT that represents a pixel-to-pixel mapping of source pixel coordinates of an input image to destination pixel coordinates of an output image. A first of the generated LUTs, also referred to as a fast remap table, represents a vector-to-pixel mapping of a first plurality of vectors of the destination pixel coordinates to a first plurality of vectors of the source pixel coordinates based on the pre-computed LUT, where all of the pixel-to-pixel mappings in the pre-computed LUT are linear with a slope of one (1) for all of the destination pixel coordinates in each of the first plurality of vectors. The second generated LUT, also referred to as an outlier index, represents a listing of a second plurality of vectors of the destination pixel coordinates, where at least one of the pixel-to-pixel mappings in the pre-computed LUT is not linear with slope 1 for any of the destination pixel coordinates in each of the second plurality of vectors. A linear remapping operation from a source image data is then applied to each of the destination pixel coordinates in the first plurality of vectors in the fast remap table to obtain a first portion of destination image data, and a non-linear remapping operation from the source image data is applied to each of the destination pixel coordinates in the second plurality of vectors in the outlier index to obtain a second portion of the destination image data.

General Overview

Digital image warping functions, including lens distortion correction and image rectification, are computationally complex to solve. For instance, in some digital image processing techniques, the value of an output pixel is computed as a function of one or more input pixels. A pre-computed lookup table (LUT) can be used to map coordinates of pixels in a source image to coordinates of pixels in a destination image. To evaluate each pixel individually, first a transformation value is retrieved from the LUT to obtain the coordinates of the source pixel that corresponds to the coordinates of the destination pixel. Depending on the warping function, the source pixel coordinates may not be linearly related for a given vector of destination pixel coordinates. As used in this disclosure, the term "vector" refers to a one-dimensional data array. Therefore, a scatter/gatherer input/output (I/O) technique is employed to load pixel data in the source image on a pixel-by-pixel basis for vector processing. While use of a pre-computed LUT can reduce the computational load at run time, scatter/gather I/O is less efficient than linear I/O operations since scatter/gather uses an operationally intensive per-pixel addressing scheme.

To this end, and in accordance with an embodiment of the present disclosure, it is appreciated that while the overall image warping function may not be linear in many cases, at a local scale (e.g., the length of a SIMD vector), the pixel-to-pixel coordinate mapping is nearly linear (e.g., the slope is 1) for so-called inlier pixels. To take advantage of this linearity, an image transformation operation, such as an image warping function, can be represented by a pre-computed lookup table (LUT) prior to image processing. The pre-computed LUT represents a pixel-to-pixel mapping between pixel coordinates in a source (input) image and pixel coordinates in a destination (result) image. For a given SIMD vector of horizontally adjacent pixels in the destination image (e.g., pixels in several consecutive columns of the same row), at least some of the pixel coordinates in the source image that map to the destination pixels in the vector are also horizontally adjacent. These are referred to as inlier pixels because the transformations of pixels within the same vector are linear with slope 1, or near linear for non-integer mappings. By contrast, an outlier pixel is any pixel for which the pixel-to-pixel mapping in the pre-computed LUT is non-linear with respect to the mappings of other pixels in the same vector. For vectors containing only inlier pixels, a second, fast remap table is generated based on the original, pre-computed LUT. The fast remap table represents SIMD vectors containing only inlier pixels. For example, for a given SIMD vector of 16 bytes (e.g., four RGBA pixels of data, where each RGBA pixel consumes four bytes of which three are color channels and one is an unused alpha channel), four horizontally adjacent pixels in the destination image map from four horizontally adjacent pixels in the source image. Each SIMD vector listed in the fast remap table is indexed to the coordinates of one of the source pixels that maps to one of the destination pixels in the vector. Other SIMD vectors containing at least one outlier pixel are listed in an outlier index. For each vector indexed in the fast remap table, linear vector I/O operations are used at run time to load the corresponding source pixels instead of using the relatively expensive scatter/gather vector I/O load operations via the pre-computed LUT. The remaining outlier pixels are processed using scatter/gather vector I/O operations via the original, pre-computed LUT. Numerous variations and configurations will be apparent in light of this disclosure.

FIG. 1 shows several example images pertaining to the field of digital image processing and stereo vision, in accordance with an embodiment of the present disclosure. Source images 100a and 100b are two images taken from two different perspectives. An image warping function, such as lens distortion correction and image rectification, can be used to remove distortions caused by the camera lens, which cause straight lines to appear rounded, and to perform an affine transform that aligns two stereo images so that the horizontal lines in one of the images correspond to the horizontal lines in the other image. Destination images 102a and 102b are the results of such an image warping function as applied to source images 100a and 100b, respectively. Note the alignment of the horizontal lines in images 102a and 102b.

If an image transformation operation is non-linear across many or all pixels {x, y}, then a function F({x, y}) that defines the image transformation may be difficult to compute. Since a warping function, such as described with respect to FIG. 1, can be highly non-linear (e.g., the lens distortion may involve a polynom of height ~7 or more), one technique for performing the warping function includes creating a LUT or remap table that is computed once, and then applying a so-called generic remapping operation for every input image using the pre-computed LUT. The LUT represents a pixel-to-pixel mapping of pixel coordinates in a source image to pixel coordinates in a destination image. An example of an existing warping function includes a geometric image transformation, such as OpenCV initUndistortRectifyMap( ) and remap( ). The OpenCV initUndistortRectifyMap( ) function builds a mapping of destination pixel coordinates to source pixel coordinates for the inverse mapping algorithm that is subsequently used by the remap( ) function. In other words, for each pixel in the corrected and rectified destination image, the initUndistortRectifyMap( ) function computes the corresponding pixel coordinates in the original source image from a camera.

In terms of performance, such generic remapping operations are relatively slow as they involve two input/output (I/O) steps. For example, an intermediate per-pixel read from the pre-computed LUT is performed. Next, the per-pixel coordinates obtained from the LUT are used to load pixel data in the source image using scatter/gather vector I/O. Next, a bilinear interpolation is applied to each pixel coordinate based on the source pixel data, and the interpolated source pixels are written to the destination coordinates specified by the LUT. However, in accordance with an embodiment, it is appreciated that, at a local scale (e.g., a SIMD vector length), the function F({x, y}) that defines the image transformation at the local scale for a subset of {x, y} is linear or nearly linear (e.g., the slope of the transformations is 1).

An image processing function that implements a point operation on an image (e.g., an image warping operation performed on several pixels that depends on only one of those pixels) can be mapped to a SIMD processor and efficiently chained. This is because the order of the pixels presented to each SIMD processor is unimportant as each of the resulting destination pixels in the vector only depend on one source pixel. When performing an image warping operation on those portions of an image where the integral part of the image warping function is linear with slope 1, linear vector I/O operations (point operations) can replace scatter/gather vector I/O operations, and thus reduce the total number of vector I/O operations.

Figure 2:
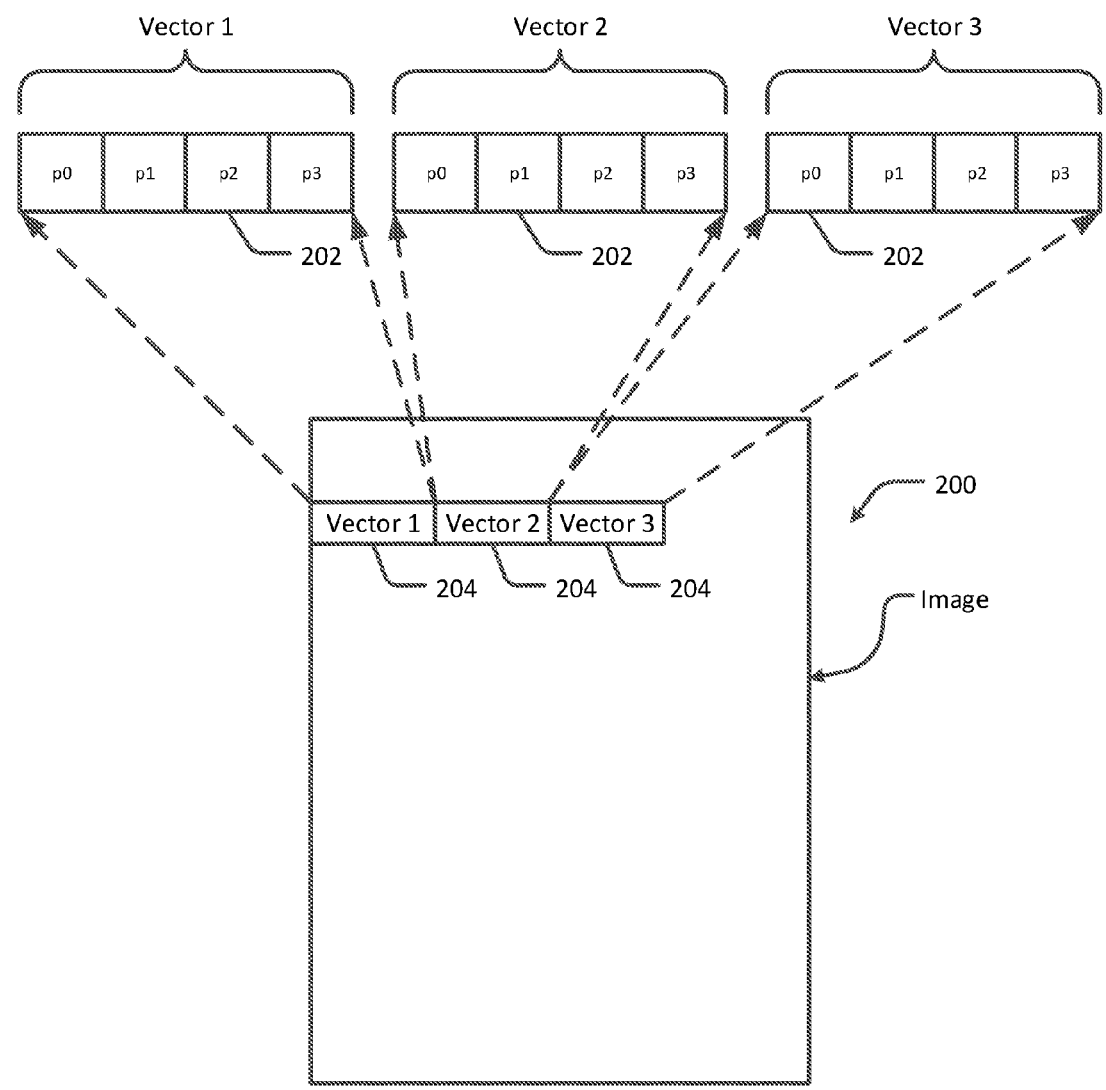
FIG. 2 shows an example arrangement of vectors in a digital image, in accordance with an embodiment of the present disclosure.

FIG. 2 shows an example image 200 containing a plurality of pixels 202 (not drawn to scale). For example, the image may include 1024 columns of pixels and 768 rows of pixels, for a total of 786,432 pixels. In accordance with an embodiment of the present disclosure, for vector processing of the image data, each pixel 202 is grouped into a vector 204 of a specified length. For example, as shown in FIG. 1, each vector 204 includes four pixels (p0, p1, p2, p3) of data.

Figure 3:
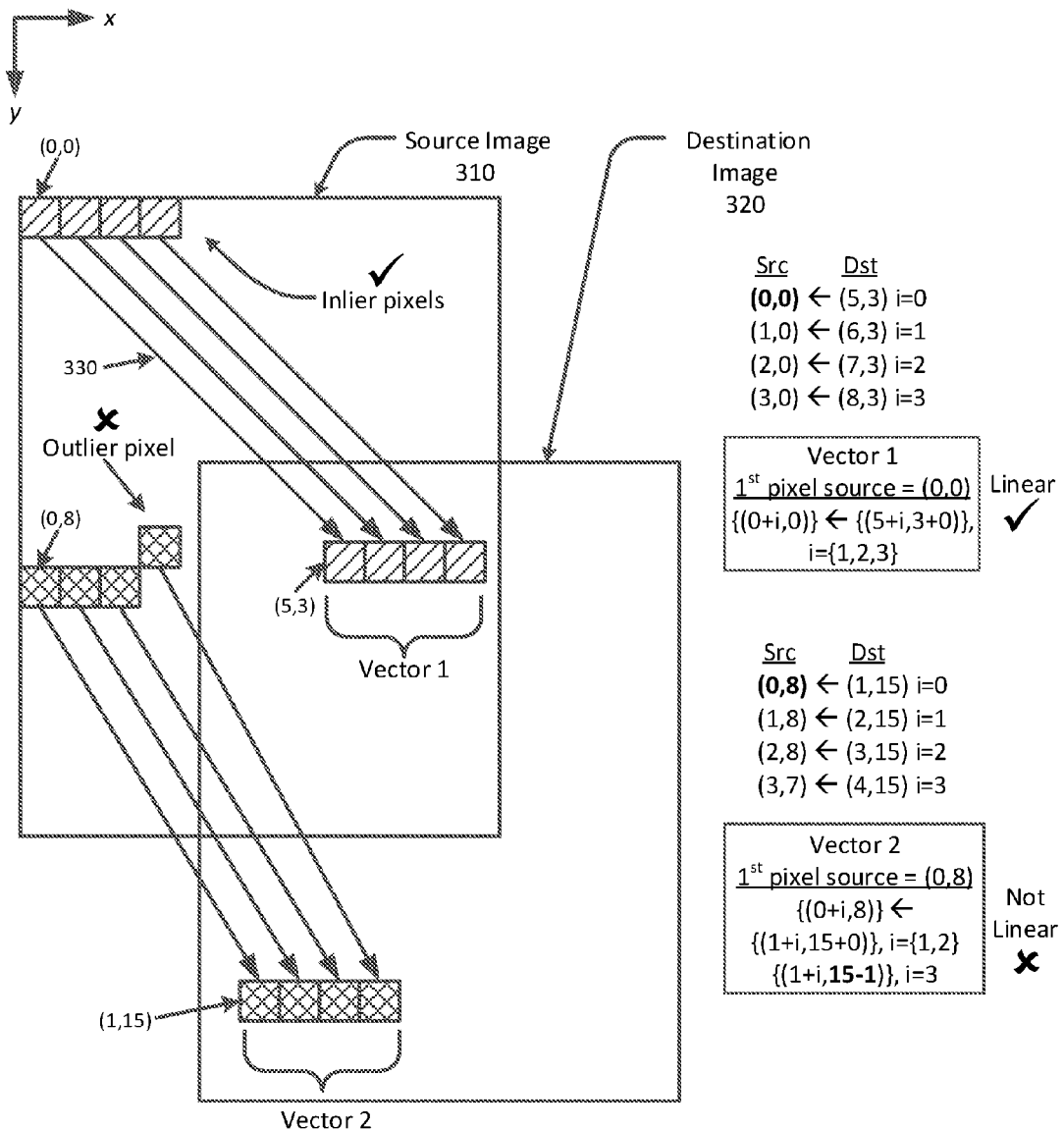
FIG. 3 shows an example source image and an example destination image that results from a geometric image transformation operation performed on the source image, in accordance with an embodiment of the present disclosure.

FIG. 3 shows an example source image 310 and an example destination image 320 (not drawn to scale) that results from a geometric image transformation operation performed on the source image 310, in accordance with an embodiment of the disclosure. In FIG. 3, horizontal rows of pixels in the source image 310 and the destination image 320 are denoted along the x axis, and vertical columns of pixels are denoted along the y axis, with the upper-leftmost pixel in each image having coordinates (x=0, y=0). The image transformation operation in this example is a pixel-to-pixel mapping of pixel coordinates in the source image 310 to pixel coordinates in the destination image 320. The mappings are represented by arrows from pixels in the source image 310 to pixels in the destination image 320 (e.g., the arrow generally indicated at 330). The mappings are further described in the tables in FIG. 3 for two vectors of pixels in the destination image 320 (Vector 1 and Vector 2). For example, the coordinates of the pixels in Vector 1 of the destination image 320 map from the coordinates of some of the pixels in the source image 310 as follows:

TABLE 1

Linear Pixel Mappings, Vector 1

| Source | Destination |
|---|---|
| (0, 0) | (5, 3) |
| (1, 0) | (6, 3) |
| (2, 0) | (7, 3) |
| (3, 0) | (8, 3) |

The mappings of the four pixels in Table 1 are linear and comply with the following equation:

$$F(\{x+i,y\})=F(\{x,y\})+\{i,0\} \quad (1)$$

In Equation (1), F({x, y}) is a function that represents the integral part of mappings for each pixel in the destination image 320, and i is an offset variable. For a vector of pixels $[(x_s, y_s), (x_s+1, y_s), \ldots (x_s+n, y_s)]$, where, $x_s$ and $y_s$ are pixel coordinates in the source image and n is the length of a vector, each pixel in the vector that complies with Equation (1) is referred to as an inlier pixel.

When performing an image warping operation on vectors that contain only inlier pixels that comply with Equation (1), such as the example Vector 1 in Table 1, the vectors of pixels in the destination image 220 that contain only inlier pixels are indexed in a fast remap table. The fast remap table relates the respective vector to the coordinates of the first source pixel in the respective mapping 330 between the source image 210 and the destination image 220. For example, referring to Table 1, the fast remap table indexes Vector 1 to source pixel coordinates (0,0) because all of the destination pixels in Vector 1 are inlier pixels. Subsequently, each destination pixel of a vector indexed in the fast remap table is processed using a linear vector I/O load of source pixel coordinates indexed from the first source pixel coordinate in the fast remap table (e.g., for a vector of length 4, pixel data for the first pixel (0,0) and the three adjacent pixels (1,0), (2,0) and (3,0) are loaded without referencing the pixel-to-pixel mapping in the pre-computed LUT). This is in contrast to a scatter/gather vector I/O load of source pixel data, in which the pre-computed LUT is referenced to obtain the corresponding source pixel coordinates for each destination pixel coordinate in the vector, and then the respective source pixel data is loaded.

Referring still to FIG. 3, the coordinates of the pixels in Vector 2 of the destination image 220 map from the coordinates of some of the pixels in the source image 210 as follows:

TABLE 2

Non-linear Pixel Mappings, Vector 2

| Source | Destination |
| --- | --- |
| (0, 8) | (1, 15) |
| (1, 8) | (2, 15) |
| (2, 8) | (3, 15) |
| (3, 8) | (4, 14) |

In contrast to the linear mappings of Table 1, the mappings in Table 2 are non-linear and do not comply with Equation (1) because the mapping of the fourth destination pixel coordinates (4,14) in Vector 2 is non-linear with respect to the mappings of the first three destination pixel coordinates in the same vector: (1,15), (2,15) and (3,15). As such, the fourth destination pixel in Vector 2 is an outlier pixel. Thus, because Vector 2 includes at least one outlier pixel, linear I/O operations cannot be used with any pixel in Vector 2. Instead, Vector 2 is added to an index of outlier vectors. All vectors in the index of outlier pixels (e.g., Vector 2) are subsequently processed using, for example, a generic remap operation, such as OpenCV initUndistortRectifyMap( ) and remap( ), rather than using a linear vector I/O load described above with respect to the inlier vectors.

Figure 4:
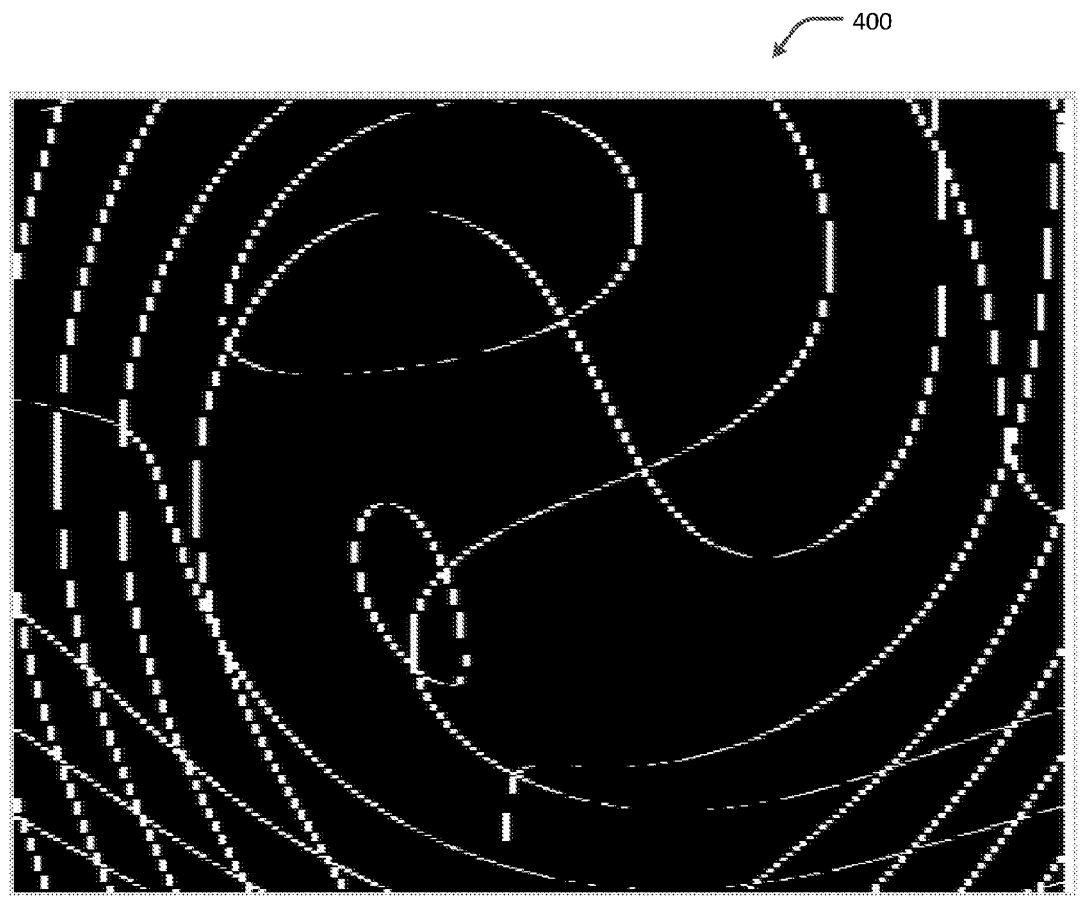
FIG. 4 is a graphical representation of inlier and outlier pixels in an example image rectification operation, in accordance with an embodiment of the present disclosure.

FIG. 4 is a graphical representation 400 of inlier and outlier pixels in an example VGA image rectification operation used for images produced by a DS4 stereo camera device, in accordance with an embodiment of the present disclosure. In the graphical representation 400, black pixels represent inlier pixels, and white pixels represent outlier pixels. As can be seen, the outlier pixels are scarce (e.g., 5% or less of all pixels), and therefore the overall performance impact of processing the outlier pixels using only the generic remap operation is marginal.

In either case, whether or not the vector contains outlier pixels, the image warping function includes resampling of the source pixels by interpolation. Interpolation is a mathematical method of reproducing missing values from a set of known values. Some image interpolation techniques include the nearest neighbor, bilinear interpolation, quadratic interpolation, cubic interpolation and spline interpolation. Bilinear interpolation can be used to determine a missing value by taking a weighted average of the surrounding known values.

Example Methodology

Figure 5:
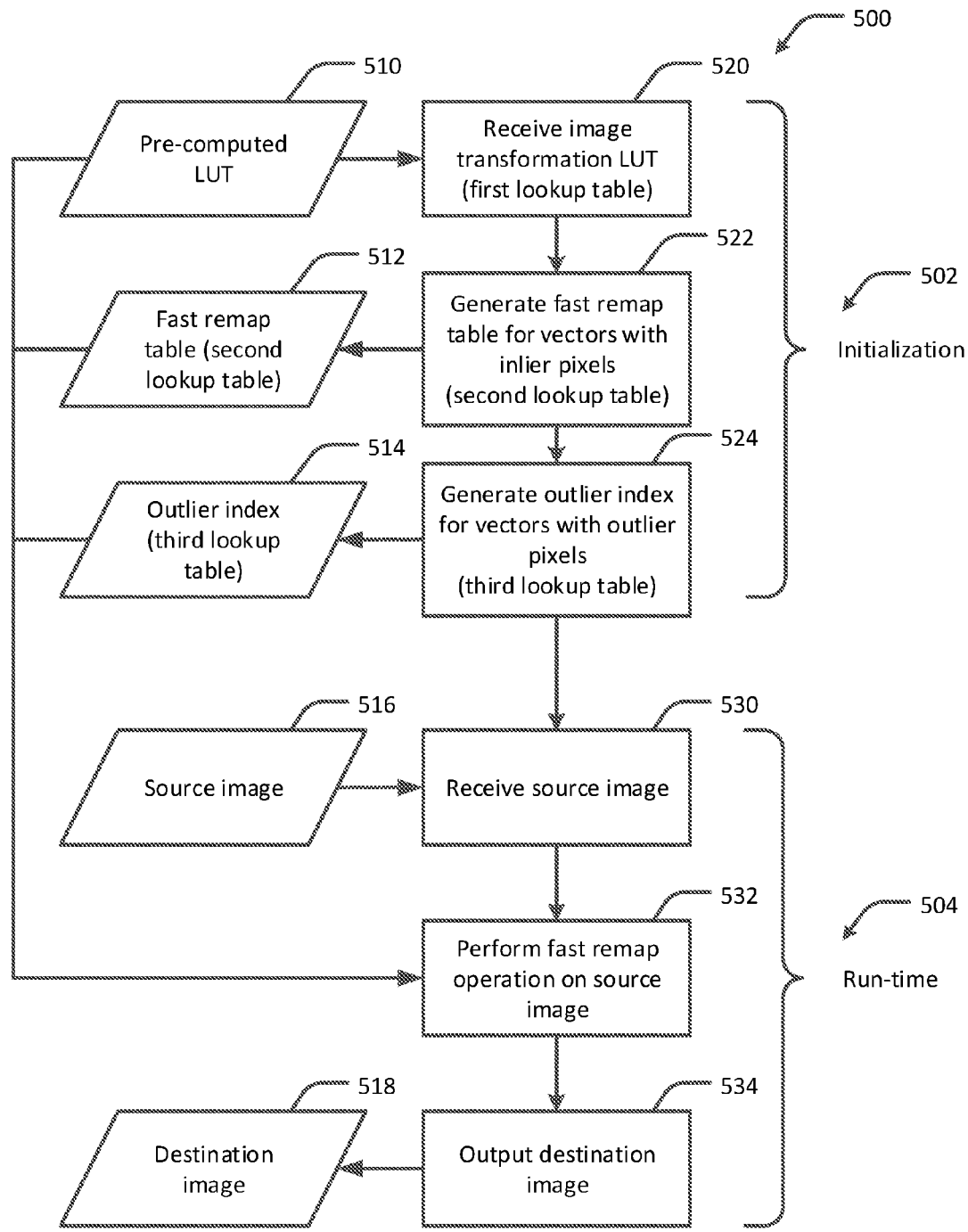
FIG. 5 is a flow diagram of an example methodology for digital image processing, in accordance with an embodiment of the present disclosure.
Figure 6:
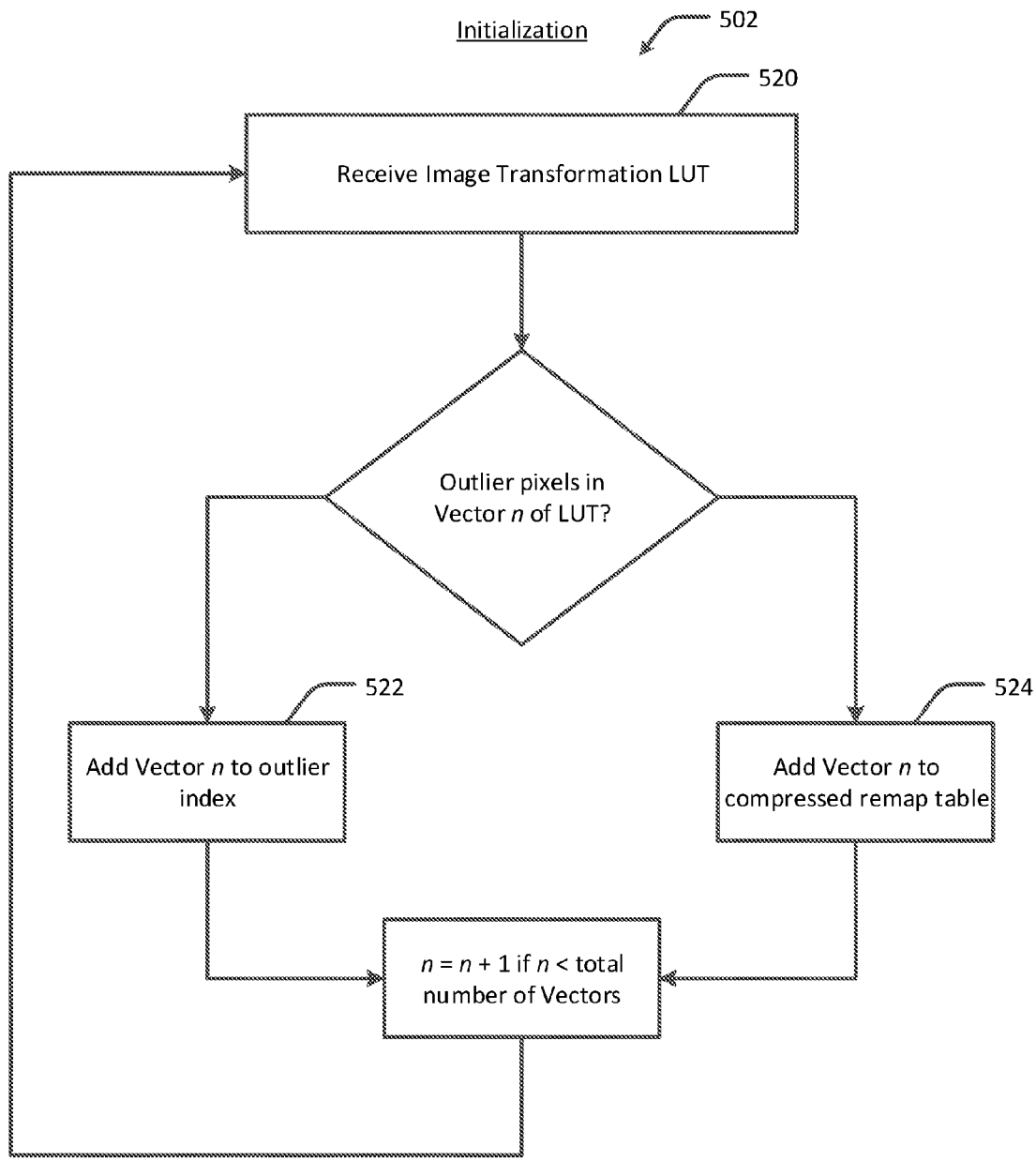
FIG. 6 is a flow diagram of a portion of the example methodology of FIG. 5, in accordance with an embodiment of the present disclosure.
Figure 7:
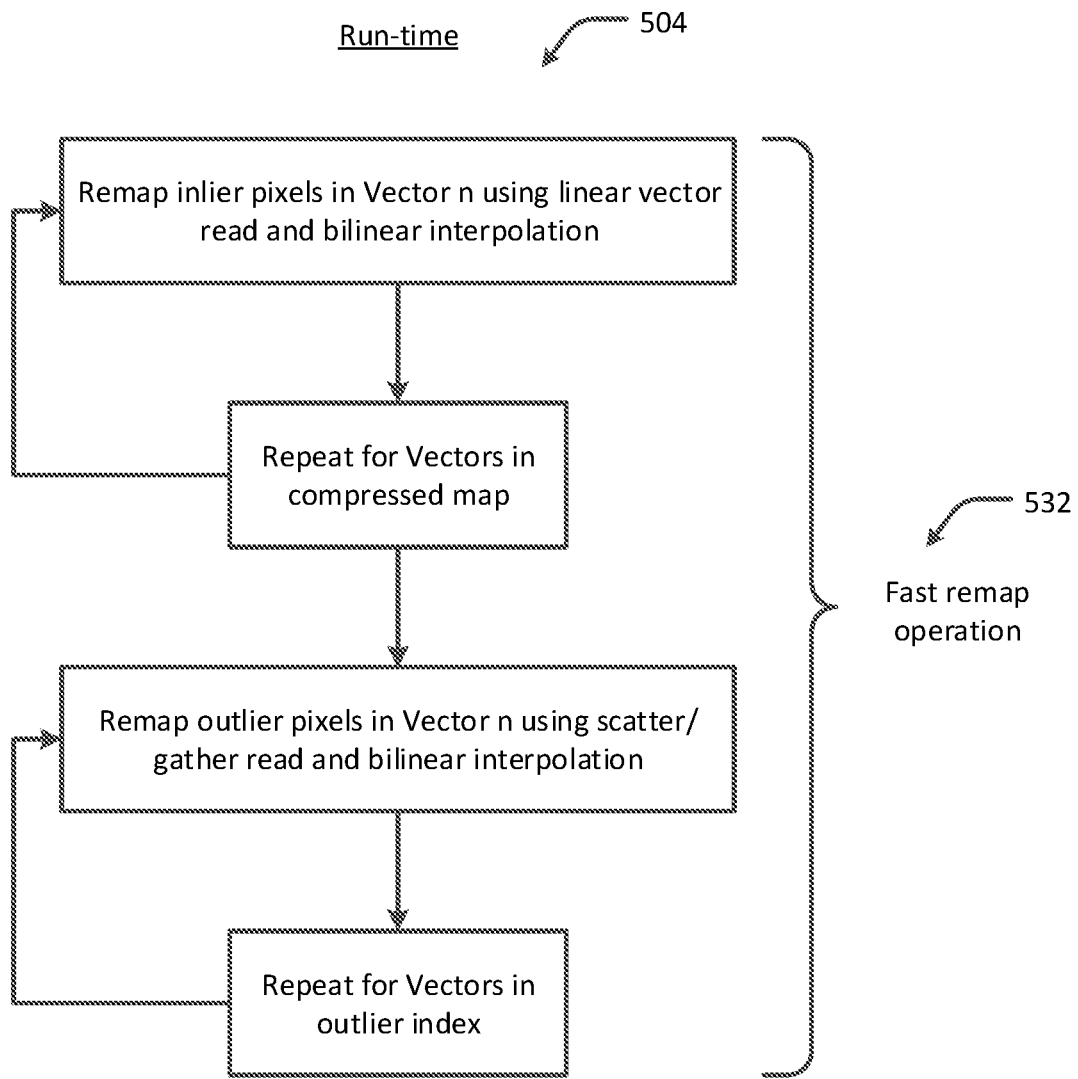
FIG. 7 is a flow diagram of another portion of the example methodology of FIG. 5, in accordance with an embodiment of the present disclosure.

FIG. 5 is a flow diagram of an example methodology 500 for image processing, in accordance with an embodiment of the present disclosure. All or portions of the methodology 500 may be implemented, for example, by a computing device 1000, such as described with respect to FIG. 8. The methodology 500 may be split into two phases: initialization 502 and run time 504. FIG. 6 is a flow diagram of the initialization phase portion 502 of the example methodology 500 of FIG. 5, in accordance with an embodiment of the present disclosure. FIG. 7 is a flow diagram of the run-time phase portion 504 of the example methodology 500 of FIG. 5, in accordance with an embodiment of the present disclosure.

During the initialization phase 502, as shown in FIGS. 5 and 6, a pre-computed image transformation LUT 510 is received 520. The pre-computed LUT 510 represents a pixel-to-pixel mapping of pixel coordinates in a source image to pixel coordinates in a destination image. Such a mapping may represent, for example, an image warping operation (e.g., lens distortion correction and stereo vision image rectification). Based on the pre-computed LUT 510, a fast remap table 512 is generated 522 for vectors with inlier pixels. The fast remap table 512 is generated based on the size of an SIMD vector that will be used for processing the input image. The pixel coordinates are grouped into vectors of the specified size. Each vector is assigned a vector number. For vectors in which the pixel-to-pixel mappings comply with the inlier pixel linear locality condition defined by Equation (1), the corresponding vector number and the coordinates of the first source pixel are stored in the fast remap table 512. In addition to the fast remap table 512, an outlier index 514 is generated 524 based on the size of the SIMD vector. For vectors in which at least one of the pixel-to-pixel mappings does not comply with Equation (1), the corresponding vector number is stored in the outlier index 514. The process of generating the fast remap table 512 and the outlier index 514 is performed for all vectors.

During the run time phase 504, as shown in FIGS. 4 and 6 a source image 516 is received 530, and a fast remap operation is performed 532 on the source image 516 to obtain and output 534 a destination image 518 having the image transformation defined by the pre-computed LUT 510. The fast remap operation 532 includes processing the vectors with inlier pixels using the fast remap table 512, and processing the vectors in the outlier index using the pre-computed LUT 510. The fast remap operation is performed for all vectors. The run time phase 504 operations can be repeated any number of times for any number of source images 516.

The following table lists experimental performance results comparing an existing image transformation operation to a new image transformation operation according to an embodiment of the present disclosure. The functions compared are rectification of different image sizes. All images are in RGBA format (each pixel consumes four bytes: three color channels and one unused alpha channel). With respect to this table, the term "rectification" refers to the following two image warping operations combined: lens distortion correction, and affine transform, ensuring lines in each image correspond to each other (e.g., such as shown in FIG. 1). The performance factor represents the approximate factor of improvement in speed for each experimental rectification.

TABLE 3

Experimental Results, RGBA Image Rectification

| Rectify Size (Input → Output) | Existing (milliseconds) | New (milliseconds) | Performance factor |
|---|---|---|---|
| 1920 × 1080 → 640 × 360 | 6.64 | 1.28 | 5.17 |
| 1920 × 1080 → 1280 × 720 | 23.70 | 5.28 | 4.49 |
| 1920 × 1080 → 1920 × 1080 | 53.76 | 5.96 | 9.03 |
| 640 × 480 → 320 × 240 | 2.74 | 0.34 | 8.12 |
| 640 × 480 → 640 × 480 | 9.12 | 0.84 | 10.79 |

Example System

Figure 8:
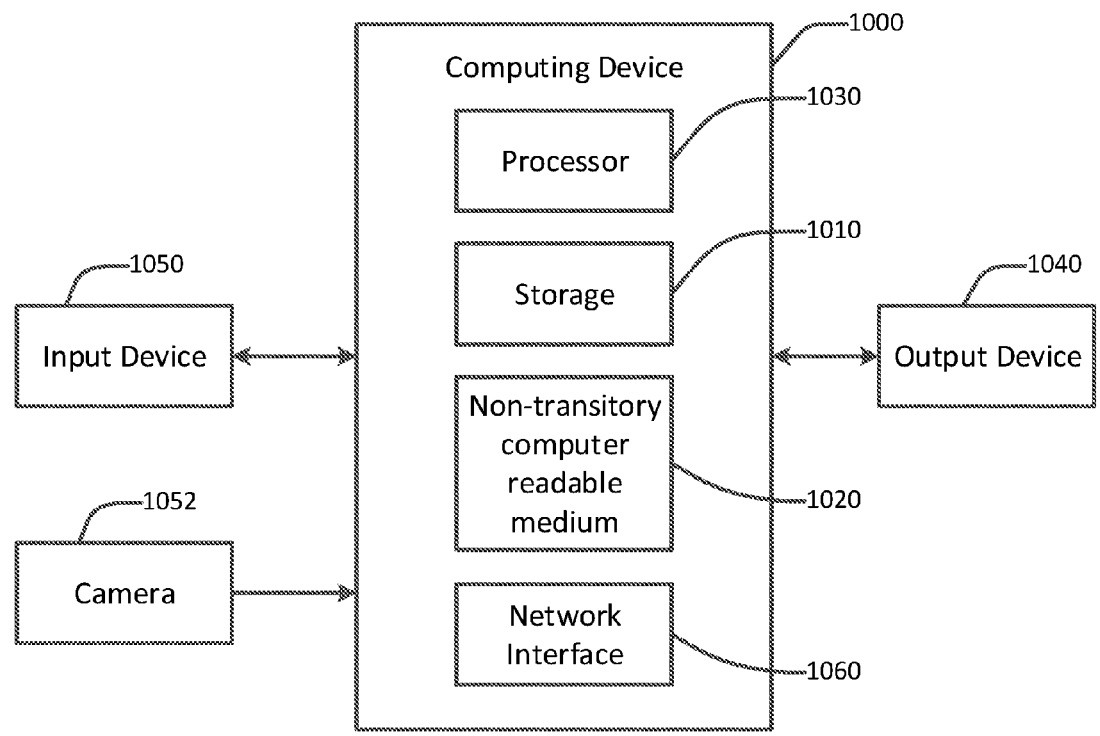
FIG. 8 is a block diagram representing an example computing device 1000 that may be used to perform any of the techniques as variously described in this disclosure.

FIG. 8 is a block diagram representing an example computing device 1000 that may be used to perform any of the techniques as variously described in this disclosure. For example, the methodologies of FIGS. 5, 6, 7, 8, or any portions thereof, may be implemented in the computing device 1000. The computing device 1000 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided comprising a plurality of such computing devices.

The computing device 1000 includes one or more storage devices 1010 and/or non-transitory computer-readable media 1020 having encoded thereon one or more computer-executable instructions or software for implementing techniques as variously described in this disclosure. The storage devices 1010 may include a computer system memory or random access memory, such as a durable disk storage (which may include any suitable optical or magnetic durable storage device, e.g., RAM, ROM, Flash, USB drive, or other semiconductor-based storage medium), a hard-drive, CD-ROM, or other computer readable media, for storing data and computer-readable instructions and/or software that implement various embodiments as taught in this disclosure. The storage device 1010 may include other types of memory as well, or combinations thereof. The storage device 1010 may be provided on the computing device 1000 or provided separately or remotely from the computing device 1000. The non-transitory computer-readable media 1020 may include, but are not limited to, one or more types of hardware memory, non-transitory tangible media (for example, one or more magnetic storage disks, one or more optical disks, one or more USB flash drives), and the like. The non-transitory computer-readable media 1020 included in the computing device 1000 may store computer-readable and computer-executable instructions or software for implementing various embodiments. The computer-readable media 1020 may be provided on the computing device 1000 or provided separately or remotely from the computing device 1000.

The computing device 1000 also includes at least one processor 1030 for executing computer-readable and computer-executable instructions or software stored in the storage device 1010 and/or non-transitory computer-readable media 1020 and other programs for controlling system hardware. Virtualization may be employed in the computing device 1000 so that infrastructure and resources in the computing device 1000 may be shared dynamically. For example, a virtual machine may be provided to handle a process running on multiple processors so that the process appears to be using only one computing resource rather than multiple computing resources. Multiple virtual machines may also be used with one processor.

A user may interact with the computing device 1000 through an output device 1040, such as a screen or monitor, which may display images provided in accordance with some embodiments. The output device 1040 may also display other aspects, elements and/or information or data associated with some embodiments. The computing device 1000 may include other I/O devices 1050 for receiving input from a user, for example, a keyboard, a joystick, a game controller, a pointing device (e.g., a mouse, a user's finger interfacing directly with a display device, etc.), or any suitable user interface. The computing device 1000 may include other suitable conventional I/O peripherals, such as a camera 1052. The computing device 1000 can include and/or be operatively coupled to various suitable devices for performing one or more of the functions as variously described in this disclosure.

The computing device 1000 may run any operating system, such as any of the versions of Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device 1000 and performing the operations described in this disclosure. In an embodiment, the operating system may be run on one or more cloud machine instances.

Various embodiments can be implemented using hardware elements, software elements, or a combination of both. Examples of hardware elements includes processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Unless specifically stated otherwise, it will be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or displays.

As will be appreciated in light of this disclosure, the various modules and components of the system can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions performed by the user computing system, as described in this disclosure, can be performed by similar processors and/or databases in different configurations and arrangements, and that the depicted embodiments are not intended to be limiting. Various components of this example embodiment, including the computing device 1000, can be integrated into, for example, one or more desktop or laptop computers, workstations, tablets, smart phones, game consoles, set-top boxes, or other such computing devices. Other componentry and modules typical of a computing system, such as processors (e.g., central processing unit and co-processor, graphics processor, etc.), input devices (e.g., keyboard, mouse, touch pad, touch screen, etc.), and operating system, are not shown but will be readily apparent.

Further Example Embodiments

The following examples pertain to further embodiments, from which numerous permutations and configurations will be apparent.

Example 1 is a computer-implemented image processing method, comprising: receiving, by a computer processor, a first lookup table representing a pixel-to-pixel mapping of source pixel coordinates of an input image to destination pixel coordinates of an output image; generating, by the computer processor, a second lookup table representing a vector-to-pixel mapping of a first plurality of vectors of the destination pixel coordinates to a first plurality of the source pixel coordinates based on the first lookup table, where all of the destination pixel coordinates in each of the first plurality of vectors correspond to pixel-to-pixel mappings in the first lookup table that are linear with slope 1 with respect to each other; and generating, by the computer processor, a third lookup table representing a listing of a second plurality of vectors of the destination pixel coordinates, where at least one of the destination pixel coordinates in each of the second plurality of vectors correspond to a pixel-to-pixel mapping in the first lookup table that is not linear with slope 1 with respect to other pixel-to-pixel mappings.

Example 2 includes the subject matter of claim 1, where the method comprises receiving, by the computer processor, source image data; applying, by the computer processor, a linear remapping operation from the source image data to each of the destination pixel coordinates in the first plurality of vectors in the second lookup table to obtain a first portion of destination image data; and applying, by the computer processor, a non-linear remapping operation from the source image data to each of the destination pixel coordinates in the second plurality of vectors in the third lookup table to obtain a second portion of the destination image data.

Example 3 includes the subject matter of Example 2, where the linear remapping operation comprises retrieving, by the computer processor and from the source image data, first source pixel data corresponding to a respective one of the first plurality of vectors in the second lookup table based on the vector-to-pixel mapping in the second lookup table.

Example 4 includes the subject matter of Example 3, where the method comprises performing, by the computer processor, an interpolation on the first source pixel data to obtain the first portion of the destination image data.

Example 5 includes the subject matter of any of Examples 2-4, where the non-linear remapping operation comprises retrieving, by the computer processor and from the source image data, second source pixel data corresponding to a respective one of the second plurality of vectors in the third lookup table based on the pixel-to-pixel mapping in the first lookup table.

Example 6 includes the subject matter of Example 4, where the method comprises performing, by the computer processor, an interpolation on the second source pixel data to obtain the second portion of the destination image data.

Example 7 includes the subject matter of any of Examples 1-6, where all of the pixel-to-pixel mappings in the first lookup table comply with the following equation for all of the destination pixel coordinates in each of the first plurality of vectors: $F(\{x+i,y\})=F(\{x,y\})+\{i,0\}$.

Example 8 includes the subject matter of any of Examples 1-7, where each of the first and second pluralities of vectors comprises at least two adjacent destination pixel coordinates.

Example 9 is a non-transitory computer program product having instructions encoded thereon that when executed by one or more processors cause a process to be carried out, the process comprising: receiving a first lookup table representing a pixel-to-pixel mapping of source pixel coordinates of an input image to destination pixel coordinates of an output image; generating a second lookup table representing a vector-to-pixel mapping of a first plurality of vectors of the destination pixel coordinates to a first plurality of the source pixel coordinates based on the first lookup table, where all of the pixel-to-pixel mappings in the first lookup table are linear with slope 1 for all of the destination pixel coordinates in each of the first plurality of vectors; generating a third lookup table representing a listing of a second plurality of vectors of the destination pixel coordinates, where any of the pixel-to-pixel mappings in the first lookup table are not linear with slope 1 for any of the destination pixel coordinates in each of the second plurality of vectors; receiving source image data; applying a linear remapping operation from the source image data to each of the destination pixel coordinates in the first plurality of vectors in the second lookup table to obtain a first portion of destination image data; and applying a non-linear remapping operation from the source image data to each of the destination pixel coordinates in the second plurality of vectors in the third lookup table to obtain a second portion of the destination image data.

Example 10 includes the subject matter of Example 9, where the linear remapping operation comprises retrieving, from the source image data, first source pixel data corresponding to a respective one of the first plurality of vectors in the second lookup table based on the vector-to-pixel mapping in the second lookup table.

Example 11 includes the subject matter of Example 10, where the process comprises performing an interpolation on the first source pixel data to obtain the first portion of the destination image data.

Example 12 includes the subject matter of any of Examples 9-11, where the non-linear remapping operation comprises retrieving, from the source image data, second source pixel data corresponding to a respective one of the second plurality of vectors in the third lookup table based on the pixel-to-pixel mapping in the first lookup table.

Example 13 includes the subject matter of Example 12, where the process comprises performing, by the computer processor, an interpolation on the second source pixel data to obtain the second portion of the destination image data.

Example 14 includes the subject matter of any of Examples 9-13, where all of the pixel-to-pixel mappings in the first lookup table comply with the following equation for all of the destination pixel coordinates in each of the first plurality of vectors: $F(\{x+i,y\})=F(\{x,y\})+\{i,0\}$.

Example 15 includes the subject matter of any of Examples 9-14, where each of the first and second pluralities of vectors comprises at least two adjacent destination pixel coordinates.

Example 16 is a system comprising: a storage; one or more computer processors operatively coupled to the storage, the one or more computer processors configured to execute instructions stored in the storage that when executed cause any of the one or more computer processors to carry out a process comprising: receiving a first lookup table representing a pixel-to-pixel mapping of source pixel coordinates of an input image to destination pixel coordinates of an output image; generating a second lookup table representing a vector-to-pixel mapping of a first plurality of vectors of the destination pixel coordinates to a first plurality of the source pixel coordinates based on the first lookup table, where all of the pixel-to-pixel mappings in the first lookup table are linear with slope 1 for all of the destination pixel coordinates in each of the first plurality of vectors; generating a third lookup table representing a listing of a second plurality of vectors of the destination pixel coordinates, where any of the pixel-to-pixel mappings in the first lookup table are not linear with slope 1 for any of the destination pixel coordinates in each of the second plurality of vectors; receiving source image data; applying a linear remapping operation from the source image data to each of the destination pixel coordinates in the first plurality of vectors in the second lookup table to obtain a first portion of destination image data; and applying a non-linear remapping operation from the source image data to each of the destination pixel coordinates in the second plurality of vectors in the third lookup table to obtain a second portion of the destination image data.

Example 17 includes the subject matter of Example 16, where the linear remapping operation comprises retrieving, from the source image data, first source pixel data corresponding to a respective one of the first plurality of vectors in the second lookup table based on the vector-to-pixel mapping in the second lookup table.

Example 18 includes the subject matter of Example 17, where the process comprises performing an interpolation on the first source pixel data to obtain the first portion of the destination image data.

Example 19 includes the subject matter of any of Example 16-18, where the non-linear remapping operation comprises retrieving, from the source image data, second source pixel data corresponding to a respective one of the second plurality of vectors in the third lookup table based on the pixel-to-pixel mapping in the first lookup table.

Example 20 includes the subject matter of Example 19, where the process comprises performing, by the computer processor, an interpolation on the second source pixel data to obtain the second portion of the destination image data.

Example 21 includes the subject matter of any of Example 16-20, where all of the pixel-to-pixel mappings in the first lookup table comply with the following equation for all of the destination pixel coordinates in each of the first plurality of vectors: $F(\{x+i,y\})=F(\{x,y\})+\{i,0\}$.

Example 22 is a computer-implemented image processing method, comprising: receiving, by a computer processor, a first lookup table including a plurality of transform values, each of the transform values representing a pixel-to-pixel mapping of destination pixel coordinates of an output image from source pixel coordinates of an input image in which a geometrical distortion of the input image is modified by the mapping; for each of a plurality of vectors in the first lookup table, calculating, by the computer processor, a slope between the transform value corresponding to a first one of the destination pixel coordinates in the respective vector and the transform value corresponding to a second one of the destination pixel coordinates in the same vector; generating, by the computer processor, a second lookup table including a plurality of inlier pixel indices, each of the inlier pixel indices representing an association between: (i) one of the vectors for which the calculated slope is equal to 1, and (ii) the source pixel coordinates associated, via the pixel-to-pixel mapping, with the first one of the destination pixel coordinates in the respective vector; generating, by the computer processor, a third lookup table including a plurality of outlier pixel coordinates, each of the outlier pixel coordinates representing one of the destination pixel coordinates in one of the vectors for which the calculated slope is not equal to 1; for each of the vectors in the second lookup table: loading, by the computer processor, the source pixel coordinates associated, via the inlier pixel indices, with the respective vector into a single-instruction-multiple-data (SIMD) vector; and applying, by the computer processor, a bilinear interpolation to the SIMD vector to obtain the corresponding one of the destination pixel coordinates; and for each of the outlier pixel coordinates in the third lookup table: remapping, by the computer processor, the respective source pixel coordinates using the transform value in the first lookup table corresponding to the respective outlier pixel coordinates to obtain the corresponding one of the destination pixel coordinates.

Example 23 includes the subject matter of Example 22, where each of the pixel-to-pixel mappings associated with the vectors for which the calculated slope is equal to 1 comply with the following equation: F({x+i,y})=F({x,y})+{i,0}.

Example 24 includes the subject matter of any of Examples 22-23, where each of the vectors comprises at least two adjacent destination pixel coordinates.

The foregoing description of example embodiments has been presented for the purposes of illustration and description. This description is not intended to be exhaustive or to limit the present disclosure to the precise forms disclosed. Many modifications and variations are possible in light of this disclosure. This disclosure does not intend to limit the scope of the various embodiments. Future filed applications claiming priority to this application may claim the disclosed subject matter in a different manner, and may generally include any set of one or more limitations as variously disclosed or otherwise demonstrated herein.

What is claimed is:

1. A computer-implemented image processing method, comprising:
    receiving, by a computer processor, a first lookup table representing a pixel-to-pixel mapping of source pixel coordinates of an input image to destination pixel coordinates of an output image;
    generating, by the computer processor, a second lookup table representing a vector-to-pixel mapping of a first plurality of vectors of the destination pixel coordinates to a first plurality of the source pixel coordinates based on the first lookup table;
    receiving, by the computer processor, source image data; and
    applying, by the computer processor, a linear remapping operation from the source image data to each of the destination pixel coordinates in the first plurality of vectors in the second lookup table to obtain a first portion of destination image data.

2. The method of claim 1, wherein all of the destination pixel coordinates in each of the first plurality of vectors correspond to pixel-to-pixel mappings in the first lookup table that are linear with slope 1 with respect to each other.

3. The method of claim 1, wherein the linear remapping operation comprises retrieving, by the computer processor and from the source image data, first source pixel data corresponding to a respective one of the first plurality of vectors in the second lookup table based on the vector-to-pixel mapping in the second lookup table.

4. The method of claim 3, further comprising performing, by the computer processor, an interpolation on the first source pixel data to obtain the first portion of the destination image data.

5. The method of claim 1, further comprising generating a third lookup table representing a listing of a second plurality of vectors of the destination pixel coordinates.

6. The method of claim 5, wherein at least one of the destination pixel coordinates in each of the second plurality of vectors correspond to a pixel-to-pixel mapping in the first lookup table that is not linear with slope 1 with respect to other pixel-to-pixel mappings.

7. The method of claim 5, further comprising applying a non-linear remapping operation from the source image data to each of the destination pixel coordinates in the second plurality of vectors in the third lookup table to obtain a second portion of the destination image data.

8. The method of claim 7, wherein the non-linear remapping operation comprises retrieving, by the computer processor and from the source image data, second source pixel data corresponding to a respective one of the second plurality of vectors in the third lookup table based on the pixel-to-pixel mapping in the first lookup table.

9. The method of claim 8, further comprising performing, by the computer processor, an interpolation on the second source pixel data to obtain the second portion of the destination image data.

10. A computer program product comprising a non-transitory, computer-readable medium having instructions encoded thereon that when executed by one or more processors cause a process to be carried out, the process comprising:
    receiving a first lookup table representing a pixel-to-pixel mapping of source pixel coordinates of an input image to destination pixel coordinates of an output image;
    generating a second lookup table representing a vector-to-pixel mapping of a first plurality of vectors of the destination pixel coordinates to a first plurality of the source pixel coordinates based on the first lookup table;
    receiving source image data; and
    applying a linear remapping operation from the source image data to each of the destination pixel coordinates in the first plurality of vectors in the second lookup table to obtain a first portion of destination image data.

11. The computer program product of claim 10, wherein all of the pixel-to-pixel mappings in the first lookup table are linear with slope 1 for all of the destination pixel coordinates in each of the first plurality of vectors.

12. The computer program product of claim 10, wherein the linear remapping operation comprises retrieving, from the source image data, first source pixel data corresponding to a respective one of the first plurality of vectors in the second lookup table based on the vector-to-pixel mapping in the second lookup table.

13. The computer program product of claim 12, wherein the process further comprises performing an interpolation on the first source pixel data to obtain the first portion of the destination image data.

14. The computer program product of claim 10, wherein the process further comprises generating a third lookup table representing a listing of a second plurality of vectors of the destination pixel coordinates.

15. The computer program product of claim 14, wherein any of the pixel-to-pixel mappings in the first lookup table are not linear with slope 1 for any of the destination pixel coordinates in each of the second plurality of vectors.

16. The computer program product of claim 14, wherein the process further comprises applying a non-linear remapping operation from the source image data to each of the destination pixel coordinates in the second plurality of vectors in the third lookup table to obtain a second portion of the destination image data.

17. The computer program product of claim 16, wherein the non-linear remapping operation comprises retrieving, from the source image data, second source pixel data corresponding to a respective one of the second plurality of vectors in the third lookup table based on the pixel-to-pixel mapping in the first lookup table.

18. The computer program product of claim 17, wherein the process further comprises performing, by the computer processor, an interpolation on the second source pixel data to obtain the second portion of the destination image data.

19. A system comprising:
    a storage;
    one or more computer processors operatively coupled to the storage, the one or more computer processors configured to execute instructions stored in the storage that when executed cause any of the one or more computer processors to carry out a process comprising:

receiving a first lookup table representing a pixel-to-pixel mapping of source pixel coordinates of an input image to destination pixel coordinates of an output image;

generating a second lookup table representing a vector-to-pixel mapping of a first plurality of vectors of the destination pixel coordinates to a first plurality of the source pixel coordinates based on the first lookup table;

receiving source image data; and applying a linear remapping operation from the source image data to each of the destination pixel coordinates in the first plurality of vectors in the second lookup table to obtain a first portion of destination image data.

20. The system of claim 19, wherein the linear remapping operation comprises retrieving, from the source image data, first source pixel data corresponding to a respective one of the first plurality of vectors in the second lookup table based on the vector-to-pixel mapping in the second lookup table.

21. The system of claim 20, wherein the process further comprises performing an interpolation on the first source pixel data to obtain the first portion of the destination image data.

22. The system of claim 19, wherein the process further comprises generating a third lookup table representing a listing of a second plurality of vectors of the destination pixel coordinates.

23. The computer program product of claim 22, wherein the process further comprises applying a non-linear remapping operation from the source image data to each of the destination pixel coordinates in the second plurality of vectors in the third lookup table to obtain a second portion of the destination image data.

24. The system of claim 23, wherein the non-linear remapping operation comprises retrieving, from the source image data, second source pixel data corresponding to a respective one of the second plurality of vectors in the third lookup table based on the pixel-to-pixel mapping in the first lookup table.

25. The system of claim 24, wherein the process further comprising performing, by the computer processor, an interpolation on the second source pixel data to obtain the second portion of the destination image data.

* * * * *